May 16, 1967 C. E. JEDREY, JR 3,320,614
REMOTE ORIENTATION INDICATOR
Filed May 27, 1965 4 Sheets-Sheet 1

INVENTOR
CHARLES E. JEDREY, Jr.

BY James D. Murray
ATTORNEYS

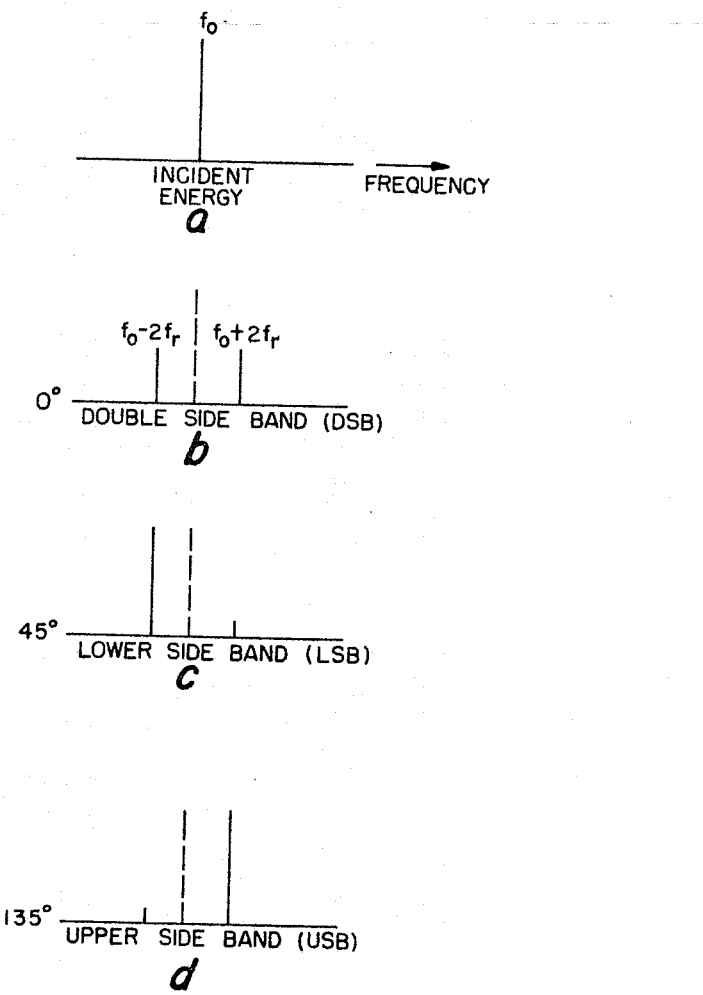

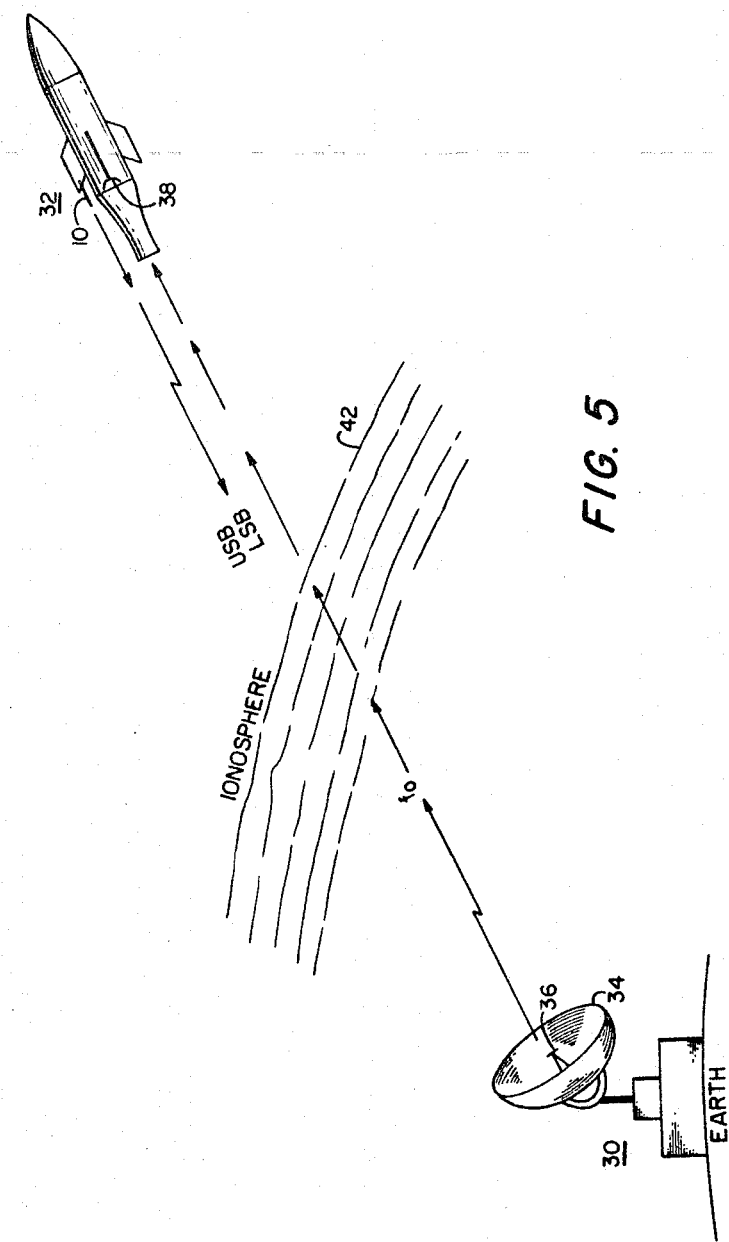

United States Patent Office 3,320,614
Patented May 16, 1967

3,320,614
REMOTE ORIENTATION INDICATOR
Charles E. Jedrey, Jr., 7906 Halleck St.,
District Heights, Md. 20028
Filed May 27, 1965, Ser. No. 459,478
4 Claims. (Cl. 343—18)

The invention described herein may be manufactured and used by or for the Government of the United States of America for governmental purposes without the payment of any royalties thereon or therefor.

The present invention relates to an orientation determining method and apparatus and more particularly to a method and apparatus whereby an interrogating station can determine the actual or desired orientation of a remote vehicle relative to a control station.

Of the problems attendant with space exploration, either by manned or unmanned vehicles, communication is certainly one of the most vital. Also, because of complications associated with the earth's upper atmosphere, because of the tremendous distances involved and because of the absolute need to minimize the size, weight and power requirements of the communication equipment aboard the space craft, the communication problem is exceedingly complex.

In communicating with a space craft, it is often desirable to employ systems which utilize linearly polarized electromagnetic energy of high frequency. For optimum performance these systems require the proper alignment of antennas. This task is complicated because the space craft is (for purposes of using them as reference systems) beyond the earth's gravitational and magnetic fields and because of the distortions experienced as the polarized electromagnetic energy passes through the electromagnetically active layers in the earth's upper atmosphere.

The general purpose of this invention is to allow an interrogating or control station to determine the actual or desired orientation of a remote vehicle. Specific examples of uses of this invention include the actual orientation of an aircraft relative to the landing deck of a carrier, the actual orientation of one space vehicle relative to another vehicle also located in space and, for purposes of optimizing communication, the preferred direction of linear polarization of energy transmitted from earth through electromagnetically active or ionized layers of the earth's atmosphere to a vehicle in space. Further, the invention contemplates accomplishing such results at the discretion of the interrogating station without requiring the active assistance of the remote vehicle. This latter feature of requiring only the passive assistance of the remote vehicle is of obvious desirability when the vehicle is unmanned or is involved in a mission requiring radio silence.

The above described results are obtained by including on the remote vehicle one or more passive reflector devices which reflect signals that are frequently translated from the frequency of the incident, i.e., interrogating station originated, signal. The translation direction and the amplitude of the reflected signals is indicative of the orientation of the remote vehicle when there is no active electromagnetic layer between the control station and the remote vehicle. In the event that an active electromagnetic layer, such as the ionosphere, does exist between an earth station and a space vehicle, the invention is useful in determining the preferred direction of linear polarization of the transmitted energy for purposes of optimizing the communication with the space vehicle. Since the distortion effect, such as Faraday rotation, of the ionosphere is frequency sensitive, the interrogating signal of the invention must be the same as the communication frequency. Further, is sufficient knowledge is available as to the strength of the ionosphere to allow a computation of polarization distortion, the actual orientation of the space vehicle can be determined.

It is therefore an object of the present invention to provide a method of and apparatus for obtaining the optimum communication with a space vehicle.

Another object is to provide a method of and a system for determining the orientation of a remote vehicle.

Yet another object of the present invention is the provision of a passive reflection device which reflects an incident signal with an amplitude and a frequency translation that is indicative of the orientation of the device relative to the polarization direction of the incident signal.

A still further object of the invention is to provide a method and apparatus which will enable operators at a control station to optimize communication with a remote vehicle while requiring only passive assistance from the remote vehicle.

Other objects and features of the invention will become apparent to those skilled in the art as the disclosure is made in the following description of the invention as illustrated in the accompanying drawings in which:

FIGS. 2, 3 and 4 are diagrams which are helpful in explaining the operation of the device in FIG. 1; and FIG. 5 illustrates a communication system which utilizes the device of FIG. 1.

Figure 1:
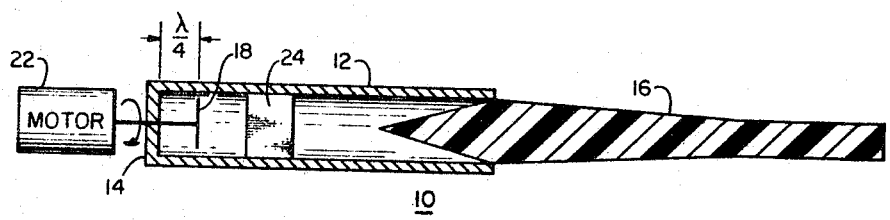
FIG. 1 illustrates a passive reflection device.

Referring now to the drawings, wherein like reference characters designate like or corresponding parts throughout the several views, there is shown in FIG. 1 a passive reflection device 10 which is, in some respects, similar in operational theory and structure to the frequency shifter disclosed in U.S. Patent No. 3,166,724 granted to Philip J. Allen on January 19, 1965. The circular waveguide 12 is closed at one end by reflecting surface 14. A symmetrical antenna, such as polyrod antenna 16, which conventionally is constructed of polystyrene or equivalent dielectric material, is located at the other end of waveguide 12. Rotating dipole 18 is continuously rotated at a rate $f_r$ by constant speed motor 22 and is located a quarter-wavelength inside reflecting surface 14. Quarter-wave plate 24 is located inside waveguide 12 between the dipole 18 and antenna 16.

Figure 2:
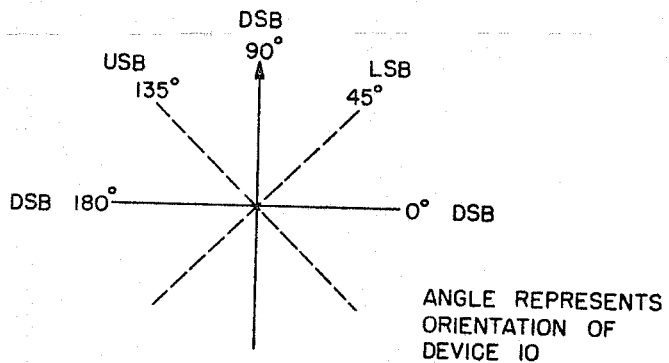
Figure 3:
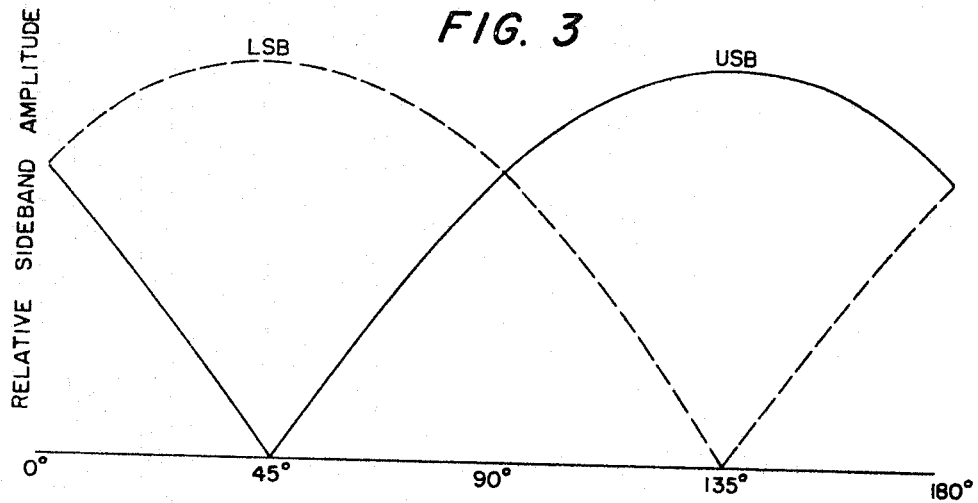

FIGS. 2, 3 and 4 are helpful in explaining the operation of the device of FIG. 1. If vertically polarized energy at a frequency $f_0$, symbolically represented in FIG. 4(a), is incident upon polyrod antenna 16 and the quarter-wave plate 24 is horizontal, the energy reflected by device 10 will contain equal sideband components at the frequencies $f_0 \pm 2f_r$ where $f_r$ is the aforementioned speed of the motor 22. These reflected upper and lower sideband (USB and LSB) signals are linearly polarized and occur in the orthogonal vertical and horizontal directions. The relationship between the upper and lower sideband signals and their direction of polarization is interchangeable by reversal of the direction of rotation of dipole 18 and motor 22.

The above described orientation of the device 10 is defined as 0° and is symbolically illustrated in FIG. 4(b). If the device of FIG. 1 is then rotated 45°, the amplitude of one of the sideband components will increase to a maximum while the other will decrease to a minimum. As illustrated in FIGS. 2, 3 and 4(c), the lower sideband LSB is shown as being a maximum at 45°, although it should be recognized that this is completely a matter of choice and that the illustrated result can be changed, i.e., USB a maximum at 45°, by reversing the direction of the rotation of motor 22. As the device 10 is further rotated, the sidebands change in amplitude, as shown in FIG. 3, until at 90° they are equal, an event symbolized as DSB (double sideband). When the rotation of the device has reached 135°, the upper sideband USB has reached a maximum and the lower sideband a minimum as illustrated in FIGS. 2, 3 and 4(d). As shown particularly in FIG. 3, it is apparent that except for ambiguities at 0°, 90° and 180°, the relative amplitudes of the upper and lower sidebands define the angular orientation of the device 10 in the range of 0° to 180°.

In the above description of the operation of device 10, the energy incident on polyrod 16 was specified as being vertically linearly polarized. Although linearly polarized incident energy is preferable, it should be recognized that the device is also operable with incident signals which are circularly or elliptically polarized.

It will be, of course, obvious to persons skilled in the microwave arts that the receiver-antenna combination used must be compatible with the reflections from the device 10. More specifically, regardless of the transmitted polarization the receiver-antenna combination must be capable of detecting both of the orthogonally linearly polarized reflected signals.

The device of FIG. 1 has utility in many varied environments, such as determining the roll orientation of an aircraft relative to the landing deck of a carrier or determining the actual orientation of one space vehicle relative to another vehicle also located in space. FIG. 5 illustrates another use of the device 10 in a system for optimizing communication between station 30, located on earth, and a space vehicle 32 located beyond the ionosphere 42 and including at least one device 10.

Station 30 includes a transmitter and receiver 34 which functions to radiate electromagnetic energy which is linearly polarized in one direction and to receive electromagnetic energy which is linearly polarized in two orthogonal directions. The polarization directions for transmission and reception are individually adjustable by changing the position of various components, schematically identified by the numeral 36. For optimum communication between station 30 and space vehicle 32, which includes transmitting and receiving apparatus 38, it is necessary that components 36 be so adjusted that the linearly polarized transmitted communication signal, after distortion, i.e., Faraday rotation, in the ionosphere, arrives at the space vehicle 32 in a predetermined directional relationship with the space vehicle 32. The angular orientation of the space vehicle is, of course, initially unknown to the operators at station 30. However, by analyzing the sideband return signals from the devices 10 on space vehicle 32, it is possible for the operators at station 30 to determine the relative angular relationship between the space vehicle 32 and the linearly polarized signals arriving at the space vehicle from station 30 and to adjust the components 36 until the predetermined desired relationship is obtained. It will be noted that the polarization alignment of the apparatus at station 30 and on vehicle 32 can be accomplished with only passive assistance from the vehicle 32. This latter feature is of the utmost significance if vehicle 32 is either unmanned or operating under conditions of radio silence.

It will also be recognized that in addition to optimizing the communication between station 30 and space vehicle 32, the actual orientation of the space vehicle 32 can be determined if sufficient data is known of the ionosphere 42 to allow a computation of the signal distortion caused by this layer. Further, it will be recognized that since the distortion effects of the ionosphere vary with the frequency of the signal passing therethrough, the frequency of the signals from station 30 which are used to determine the desired polarization direction (by sideband analysis of the signals reflected by devices 10) and the frequency of the communication signal should be the same, or very nearly the same.

As previously brought out in the description of device 10, the analysis of the reflected sidebands will not unambiguously define the angular orientation of device 10. The use of several devices 10, with the quarter-wave plate 24 of each device 10 being angularly displaced from each other, will allow for the elimination of some of these ambiguities. Further, the direction the sideband amplitudes change with small changes of incident polarization direction about the ambiguity points is also helpful in eliminating these ambiguities.

If more than one device 10 is used aboard the space vehicle 32, the motors 22 of each device 10 should rotate at different speed to reflect different frequency sidebands, thus enabling the operators at station 30 to correlate the reflected sideband signals to a particular device 10 and a particularly oriented quarter-wave plate 24.

There has been disclosed a device 10 which reflects sideband signals, the relative amplitudes of which are, with several ambiguities, definitive of the angular orientation of the device in relation to the direction of polarizaton of incident electromagnetc energy. There has also been disclosed a method for utilizing the device 10 to optimize the communication between a control or interrogating station 30 and a remote vehicle 32 with only passive assistance by the vehicle. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A method of determining the orientation of a remote station comprising the following steps:
    Transmitting from a control station a signal of predetermined frequency which is polarized in a predetermined manner;
    Reflecting said signal from said remote station as two signal components of frequencies different than said predetermined frequency and which have relative amplitudes that are indicative of the orientation of said remote station;
    Receiving said two signal components at said control station and
    Analyzing the amplitudes of said two received signal components to determine the orientation of said remote station.

2. The method of determining as set forth in claim 1 wherein said predetermined manner of polarization is linear polarization.

3. A method for determining the orientation of a remote station which is separated from a control station by a medium which is at least partially electromagnetically active comprising the following steps:
    Transmitting from said control station a signal of predetermined frequency which is linearly polarized in a predetermined direction;
    Determining the distortion of said signal caused by said medium which is at least partially electromagnetically active;
    Reflecting said signal from said remote station as two signal components of frequencies different than said predetermined frequency and which have relative amplitudes that are indicative of the relative angular orientation of said remote station and the direction of polarization of said linearly polarized signal as it arrives at said remote station;
    Receiving said two signal component at said control station and
    Analyzing the amplitudes of said two received signal components and the distortion caused by said partially electromagnetically active medium to determine the orientation of said remote station.

4. A method of optimizing communication between a control station and a remote station of unknown orientation comprising the following steps:
    Transmitting from said control station a signal of predetermined frequency which is linearly polarized in a predetermined direction;

Reflecting said signal from said remote station as two signal components of frequencies different than said predetermined frequency and which have relative amplitudes that are indicative of the orientation of said remote station relative to the direction of polarization of said signal as said signal arrives at said remote station;

Receiving said two signal components at said control station;

Analyzing the amplitudes of said two received signal components to determine the relative orientation of said remote station and said direction of polarization of said signal at said remote station and Changing the direction of polarization of future signals transmitted by said control station so that said changed polarization direction is at a predetermined optimum relation to the orientation of said remote station when said signals arrive at said remote station.

References Cited by the Examiner
UNITED STATES PATENTS

| | | | |
|---|---|---|---|
| 3,019,430 | 1/1962 | Pedersen et al. | 343—18 |
| 3,108,275 | 10/1963 | Chisholm | 343—18 |
| 3,137,853 | 6/1964 | Cutler | 343—100 |
| 3,154,784 | 10/1964 | Allen | 343—18 |
| 3,166,724 | 1/1965 | Allen | 333—24.1 |

RODNEY D. BENNETT, *Primary Examiner.*

CHESTER L. JUSTUS, *Examiner.*

C. E. WANDS, *Assistant Examiner.*